United States Patent
Kim

(10) Patent No.: US 9,054,538 B2
(45) Date of Patent: Jun. 9, 2015

(54) BATTERY MANAGEMENT SYSTEM

(71) Applicant: Samsung SDI Co., Ltd., Yongin-si, Gyeonggi-do (KR)

(72) Inventor: Tae-Jin Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 311 days.

(21) Appl. No.: 13/733,837

(22) Filed: Jan. 3, 2013

(65) Prior Publication Data

US 2014/0062413 A1   Mar. 6, 2014

(51) Int. Cl.
*H02J 7/00*   (2006.01)
*H02H 11/00*   (2006.01)

(52) U.S. Cl.
CPC ............. *H02J 7/0029* (2013.01); *H02J 7/0014* (2013.01); *H02J 7/0026* (2013.01); *H02J 7/0031* (2013.01); *H02J 2007/0037* (2013.01); *H02J 2007/0039* (2013.01); *H02J 2007/004* (2013.01)

(58) Field of Classification Search
CPC ........................................................ H02J 7/00
USPC ........................................................ 320/134
See application file for complete search history.

(56) References Cited

U.S. PATENT DOCUMENTS

2011/0050000 A1*   3/2011   Park ........................ 307/116

FOREIGN PATENT DOCUMENTS

| KR | 10-1997-0039103 | 7/1997 |
| KR | 10-2005-0061991 | 6/2005 |
| KR | 10-2007-0105556 | 10/2007 |
| KR | 10-2009-0064825 | 6/2009 |
| KR | 10-2011-0021397 | 3/2011 |

* cited by examiner

*Primary Examiner* — Drew A Dunn
*Assistant Examiner* — Harry O'Neill-Becerril
(74) *Attorney, Agent, or Firm* — Robert E. Bushnell, Esq.

(57) ABSTRACT

In a battery management system, a charging/discharging relay has a relay switch coupled to a charging/discharging line of battery cells and a driving coil driving the relay switch, a relay driving unit is coupled to the driving coil so as to control the driving coil, a first switch is coupled to the charging/discharging relay so as to control on/off of the charging/discharging relay, and a control unit applies a control signal to control on/off of the first switch. The battery management system further includes a short circuit protection (SCP) for cutting off the power input to the coil of the relay in the occurrence of a failure in the first switch, so that the charging/discharging line may be prevented from being in an uncontrolled state due to the occurrence of a failure in a circuit component.

15 Claims, 1 Drawing Sheet

BATTERY MANAGEMENT SYSTEM

CLAIM OF PRIORITY

This application makes reference to, incorporates the same herein, and claims all benefits accruing under 35 U.S.C. §119 from an application earlier filed in the Korean Intellectual Property Office on 30 Aug. 2012 and there duly assigned Serial No. 10-2012-0095501.

BACKGROUND OF THE INVENTION

1. Field of the Invention

An aspect of the present invention relates to a battery management system, and more particularly, to a battery management system capable of safely controlling a charging/discharging line.

2. Description of the Related Art

In general, unlike primary batteries that are not rechargeable, secondary batteries are rechargeable batteries. Small-sized secondary batteries are widely used in high-tech fields such as cellular phones, notebook computers and camcorders, and large-sized secondary batteries may be provided in an energy storage system and the like.

The energy storage system is a system that connects renewable energy, a power storing battery system, and existing power from a grid. The energy storage system performs an operation of charging/discharging secondary batteries provided in the battery system.

When charging/discharging the secondary batteries, the energy storage system uses high electrical current, and hence a switching component is used as a relay.

The operation of on/off of the relay is generally implemented by controlling coil current, a switch such as a field effect transistor (FET) for controlling the coil current is additionally provided to the relay. If the relay is in a short-circuit state due to the occurrence of a failure in the switch, however, it is difficult to control the relay.

The above information disclosed in this Background section is only for enhancement of understanding of the background of the described technology and therefore it may contain information that does not form the prior art that is already known in this country to a person of ordinary skill in the art.

SUMMARY OF THE INVENTION

Embodiments of the present invention provide a battery management system having a switch for controlling a relay, in which the battery management system is provided with a short circuit protection (SCP) for cutting off power input to a coil of the relay in the occurrence of a failure in the switch and a switch for controlling the SCP, thereby safely controlling a charging/discharging line.

In accordance with an aspect of the present invention, a battery management system may include a relay switch coupled to a charging/discharging line of battery cells; a charging/discharging relay having a driving coil for driving the relay switch; a relay driving unit coupled to one end of the driving coil so as to control the driving coil; a first switch coupled to the charging/discharging relay and the relay driving unit so as to control an on/off of the charging/discharging relay; a control unit that applies a control signal for controlling an on/off of the first switch; an SCP provided between the driving coil and the relay driving unit; and a second switch that controls the SCP.

The first switch may be coupled to the other end of the driving coil.

The SCP may be implemented as a fuse or positive temperature coefficient (PTC) element.

The on/off of the second switch may be controlled by a control signal of an auxiliary control unit.

The auxiliary control unit may independently operate while being disposed separately from the control unit.

The first and second switches may be implemented as field effect transistors (FETs).

The battery management system may further include a sensing unit that senses a total voltage of the battery cells and an individual voltage of each battery cell, and transmits the sensed voltages to the control unit.

The battery management system may further include a cell balancing unit that performs an operation of equalizing charging and discharging states between the battery cells.

As described above, in accordance with the present invention, in the battery management system provided with a switch for controlling a relay, the battery management system is provided with an SCP for cutting off power input to a coil of the relay in the occurrence of a failure in the switch and a switch for controlling the SCP, so that a charging/discharging line may be prevented from being in an uncontrolled state due to the occurrence of a failure in a circuit component.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
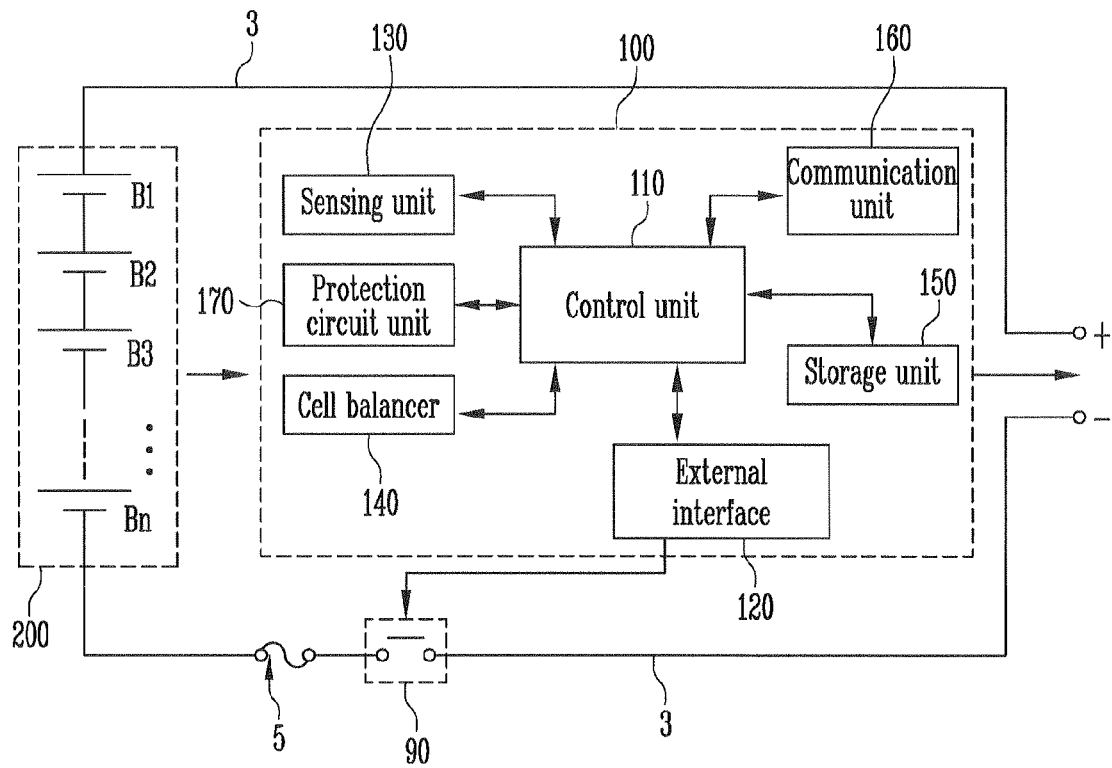
FIG. 1 is a configuration block diagram of a battery management system constructed with the principle of an embodiment of the present invention.

Hereinafter, certain exemplary embodiments according to the present invention will be described with reference to the accompanying drawings. Here, when a first element is described as being coupled to a second element, the first element may be not only directly coupled to the second element but may also be indirectly coupled to the second element via a third element. Further, some of the elements that are not essential to the complete understanding of the invention are omitted for clarity. Also, like reference numerals refer to like elements throughout.

FIG. 1 is a configuration block diagram of a battery management system constructed with the principle of an embodiment of the present invention.

In reference to FIG. 1, the battery management system 100 constructed with the principle of this embodiment includes a control unit (MCU) 110 and an external interface 120 coupled to the MCU 110 and a charging/discharging line 3.

As shown in FIG. 1, the battery management system 100 is coupled to a plurality of battery cells 200 through the charging/discharging line 3. The battery management system 100 controls charging and discharging operations of the battery cells 20 under the control of the MCU 110.

In this embodiment, it will be apparent that the battery management system 100 may be disposed separately from the battery cells 200, or alternatively, the battery management system 100 and the battery cells 200 may be integrally formed as a battery pack.

A fuse element 5 may be further provided to the charging/discharging line 3. When overcurrent is applied to the charging/discharging line 3 coupled to the battery cells 200, and therefore, the charging/discharging line 3 is overheated, the fuse element 5 may be physically cut off to protect the battery cells 200 from the overcurrent.

The battery management system 100 may perform an overcharging protection function, an overdischarging protection function, an overcurrent protection function, an overvoltage protection function, an overheating protection function, a cell balancing function and the like so as to protect the battery cells 200. To this end, the battery management system 100 may monitor the voltage, current, temperature, remaining power, lifetime and charging state of the battery cells 200, and may transmit the relative information to the MCU 100.

Therefore, as shown in FIG. 1, the battery management system 100 may further include a sensing unit 130, a cell balancing unit 140, a storage unit 150, a communication unit 160 and a protection circuit unit 170.

The sensing unit 130 may sense a total voltage of the battery cells 200 as well as an individual voltage of each battery cell B1 to Bn. The sensing unit 130 may also sense a temperature of the battery cell and an ambient temperature. The voltages and temperatures sensed by the sensing unit 130 are transmitted to the MCU 110.

The MCU 110 decides the state of charging (SOC) and state of health (SOH) of the battery cells 200, based on the voltages and temperatures transmitted from the sensing unit 130. The MCU 110 controls charging and discharging operations of the battery cells 200.

The cell balancing unit 140 performs an operation of equalizing charging and discharging states between the battery cells 200. That is, the cell balancing unit 140 charges a battery cell in a high charging state (in a low discharging state) among the battery cells 200, and discharges a battery cell in a low charging state (in a high discharging state) among the battery cells 200. Thus, the cell balancing unit 140 maintains each battery cell to be in a uniform charging state.

When the battery management system 100 is turned off, the storage unit 150 stores data such as SOC and SOH just before the turn-off of the battery management system 100. Thus, if the battery management system 100 is again turned on, the storage unit 150 enables the MCU 100 to read the data stored at the time when the battery management system 100 is finally turned off. To this end, the storage unit 150 may be configured as a nonvolatile storage device which can electrically write and erase data. For example, the storage unit 150 may be configured as an electrically erasable programmable read-only memory (EEPROM), but the present invention is not limited thereto.

The communication unit 160 allows the MCU 110 to perform communication with an external integrated controller (not shown).

That is, when it is assumed that the battery management system 100 and the battery cells 200, shown in FIG. 1, are provided in a power storage system, power generated in a power generation system may be stored in the battery cells 200 or transmitted to a grid through information provided from the communication unit 160. The power storage system may transmit the power stored in the battery cells 200 to the grid, or alternatively, the power storage system may store power supplied from the grid in the battery cells 200.

The protection circuit unit 170 protects the battery cells 200 from external impact, overcurrent, overvoltage or the like.

When the battery cells 200 are overcharged, the MCU 110 may stop charging the battery cells 200 by cutting off the path of the charging/discharging line 3.

In accordance with this embodiment, in the battery management system 100 having a switch for controlling a charging/discharging relay 90 provided to the charging/discharging line 3, the battery management system is provided with a short circuit protection (SCP) for cutting off power input to a coil of the charging/discharging relay 90 in the occurrence of a failure in the switch and a switch for controlling the SCP, so that the charging/discharging line 3 may be prevented from being in an uncontrolled state due to the occurrence of a failure in a circuit component.

In this case, the path for controlling the charging and discharging of the battery cells 200 is implemented through the external interface 120. The configuration and operation of the external interface 120 will be described in detail with reference to FIG. 2.

Figure 2:
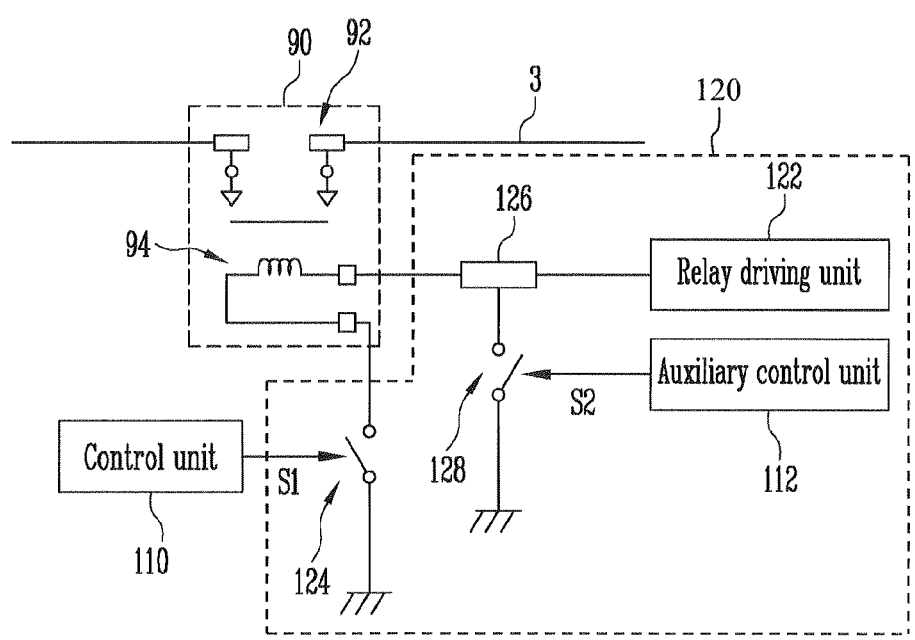
FIG. 2 is a circuit diagram showing an external interface used in the battery management system constructed with the principle of the embodiment of the present invention.

FIG. 2 is a circuit diagram showing an external interface used in the battery management system constructed with the principle of the embodiment of the present invention.

In reference to FIG. 2, the external interface 120 includes a first switch 124 coupled to the charging/discharging relay 90 and a relay driving unit 122 so as to control an on/off of the charging/discharging relay 90. In this case, the first switch 124 is controlled by the MCU 110.

The charging/discharging relay 90 is coupled between the relay driving unit 122 and the charging/discharging line 3. The charging/discharging relay 90 includes a driving coil 94 coupled to the relay driving unit 122, and a relay switch 92 coupled to the charging/discharging line 3. In this case, the on/off operation of the relay switch 92 is controlled by the driving coil 94.

The driving coil 94 controls an on/off operation of the relay switch 92. Since the driving coil 94 does not form a physical current path with the relay switch 92, the driving coil 94 can control the relay switch 92 coupled to the charging/discharging line 3 in which relatively high current flows according to a control signal of the MCU 110.

The on/off operation of the relay switch 92 is controlled by applying or cutting off current to or from the driving coil 94. The relay switch 92 is cut off in the overcharging of the battery cells 200 so as to cut off the charging/discharging line 3 coupled to the battery cells 200, thereby protecting the battery cells 200. In an embodiment, when the driving coil 94 is applied by current, the relay switch 92 is turned on; when the driving coil 94 is not applied by current, the relay switch 92 is turned off and disconnects the charging/discharging line 3.

More specifically, as shown in FIG. 2, the relay driving unit 122 is coupled to one end of the driving coil 94, and the first switch 124 is coupled to the other end of the driving coil 94.

In this case, the relay driving unit 122 is generally implemented as a 12V or 24V power unit. The driving unit 122 functions to supply current for turning on/off the relay switch 92 to the driving coil 94.

However, the supply of the current is controlled by the first switch 124. If the first switch 124 is turned off, the path along which the current flows is cut off, and therefore, the current is not supplied to the driving coil 94.

In this case, the operation of the first switch 124 is controlled by the MCU 110. In a case where the first switch 124 is implemented as a field effect transistor (FET), a control signal Si of the MCU 110 is applied to a gate electrode of the FET.

That is, in a case where the current is applied from the relay driving unit 122 to the driving coil 94 due to the turn-on of the first switch 124, the charging/discharging relay 90 is turned on. If the first switch 124 is turned off, the charging/discharging relay 90 is turned off.

However, in a case where a short circuit occurs due to a failure of the first switch 124, the charging/discharging relay 90 continuously maintain a turn-on state. In this case, even though the MCU 110 applies the control signal S1 to the first switch 124, the charging/discharging relay 90 cannot be turned off. Therefore, the risk of deterioration and explosion of the battery cell may occur due to overcharging and overcurrent.

In this case, that the charging/discharging relay 90 cannot be turned off as desired can be sensed by identifying that the current is continuously detected in the charging/discharging line 3 coupled to the charging/discharging relay 90 even after the control signal S1 is applied to the first switch 124 and then a certain period of time elapses.

The same risk may occur due to a failure of the MCU 110 that applies the control signal Si to the first switch 124.

To overcome such a risk, the battery management system constructed with the principle of this embodiment is provided with an SCP (short circuit protection) 126 for cutting off current input to the driving coil 94 of the charging/discharging relay 90 between the driving coil 94 and the relay driving unit 122, and a second switch 128 for controlling the SCP 126.

That is, the battery management system is provided with the SCP 126 for turning off the charging/discharging relay 90 in the occurrence of a failure in the first switch 124, and the second switch 128 for controlling the SCP 126. In this case, the SCP 126 may be implemented as a fuse or positive temperature coefficient (PTC) element, and the second switch 128 may be implemented as an FET, like the first switch 124.

The PTC element is an element having a positive resistance temperature coefficient characteristic that the resistance of the PTC element increases as the temperature of the PTC element increases. If the temperature of the PTC element increases, intrinsic resistance increases. Thus, the PTC element has a high resistance corresponding to an open circuit in a certain period of time.

Accordingly, in this embodiment, when the charging/discharging relay 90 cannot be turned off as desired due to a failure of the first switch 124, the second switch 128 is turned on. When the second switch 128 is turned on, the SCP 126 is operated to cut off the current path coupled from the relay driving unit 122 to the driving coil 94, and thus the charging/discharging relay 90 is turned off and the charging/discharging line 3 is disconnected.

As described above, that the charging/discharging relay 90 cannot be turned off as desired due to the failure of the first switch 124 can be sensed by identifying that the current is continuously detected in the charging/discharging line 3 coupled to the charging/discharging relay 90 even after the control signal S1 is applied to the first switch 124 and then a certain period of time elapses.

That is, through the configuration constructed with the principle of this embodiment, it is possible to prevent the charging/discharging line 3 from being in an uncontrolled state due to the occurrence of a failure in a circuit component.

However, it will be apparent that the MCU 110 may apply a control signal S2 to the second switch 128. To implement a more safe system, an auxiliary control unit 112 may be provided to independently operate while being separated from the control unit 110. The auxiliary control unit 112 applies the control signal S2 to the second switch 128 against a failure of the control unit 110.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery management system, comprising:
    a charging/discharging relay comprising a relay switch electrically coupled to a charging/discharging line of battery cells and a driving coil driving the relay switch;
    a relay driving unit electrically coupled to one end of the driving coil so as to control the driving coil;
    a first switch electrically coupled to the charging/discharging relay and the relay driving unit so as to control an on/off of the charging/discharging relay;
    a control unit that applies a control signal controlling an on/off of the first switch;
    a short circuit protection (SCP) provided between the driving coil and the relay driving unit; and
    a second switch that controls the SCP.

2. The battery management system according to claim 1, wherein the first switch is coupled to the other end of the driving coil.

3. The battery management system according to claim 1, wherein the SCP is implemented as a fuse or positive temperature coefficient (PTC) element.

4. The battery management system according to claim 1, wherein an on/off of the second switch is controlled by a control signal of an auxiliary control unit.

5. The battery management system according to claim 4, wherein the auxiliary control unit independently operates while being disposed separately from the control unit.

6. The battery management system according to claim 1, wherein the first and second switches are implemented as field effect transistors (FETs).

7. The battery management system according to claim 1, further comprising a sensing unit that senses a total voltage of the battery cells and an individual voltage of each battery cell, and transmits the sensed voltages to the control unit.

8. The battery management system according to claim 1, further comprising a cell balancing unit that performs an operation of equalizing charging and discharging states between the battery cells.

9. A battery management system, comprising:
    a charging/discharging relay comprising a relay switch and a driving coil controlling an on/off state of the relay switch, the relay switch electrically connected to a charging/discharging line of battery cells in series;
    a first switch electrically connected to one terminal of the driving coil and an on/off state of the first switch being controlled by a control unit;
    a relay driving unit disposed to supply an electrical current to the driving coil and the relay driving unit electrically connected to another terminal of the driving coil;
    a short circuit protection (SCP) provided between the driving coil and the relay driving unit, the SCP controlling the electrical current flowing through the driving coil; and
    a second switch controlling the SCP.

10. The battery management system according to claim 9, wherein the SCP is implemented as a fuse or positive temperature coefficient (PTC) element.

11. The battery management system according to claim 9, wherein an on/off of the second switch is controlled by a control signal of an auxiliary control unit.

12. The battery management system according to claim 11, wherein the auxiliary control unit independently operates while being disposed separately from the control unit.

13. The battery management system according to claim 9, wherein the first and second switches are implemented as field effect transistors (FETs).

14. The battery management system according to claim 9, further comprising a sensing unit that senses a total voltage of the battery cells and an individual voltage of each battery cell, and transmits the sensed voltages to the control unit.

15. The battery management system according to claim 9, further comprising a cell balancing unit that performs an operation of equalizing charging and discharging states between the battery cells.

* * * * *